Aug. 15, 1961 T. L. DIMOND ET AL 2,996,704
METHOD OF AND APPARATUS FOR GENERATING CODED SIGNALS
Filed Jan. 19, 1956 5 Sheets-Sheet 4

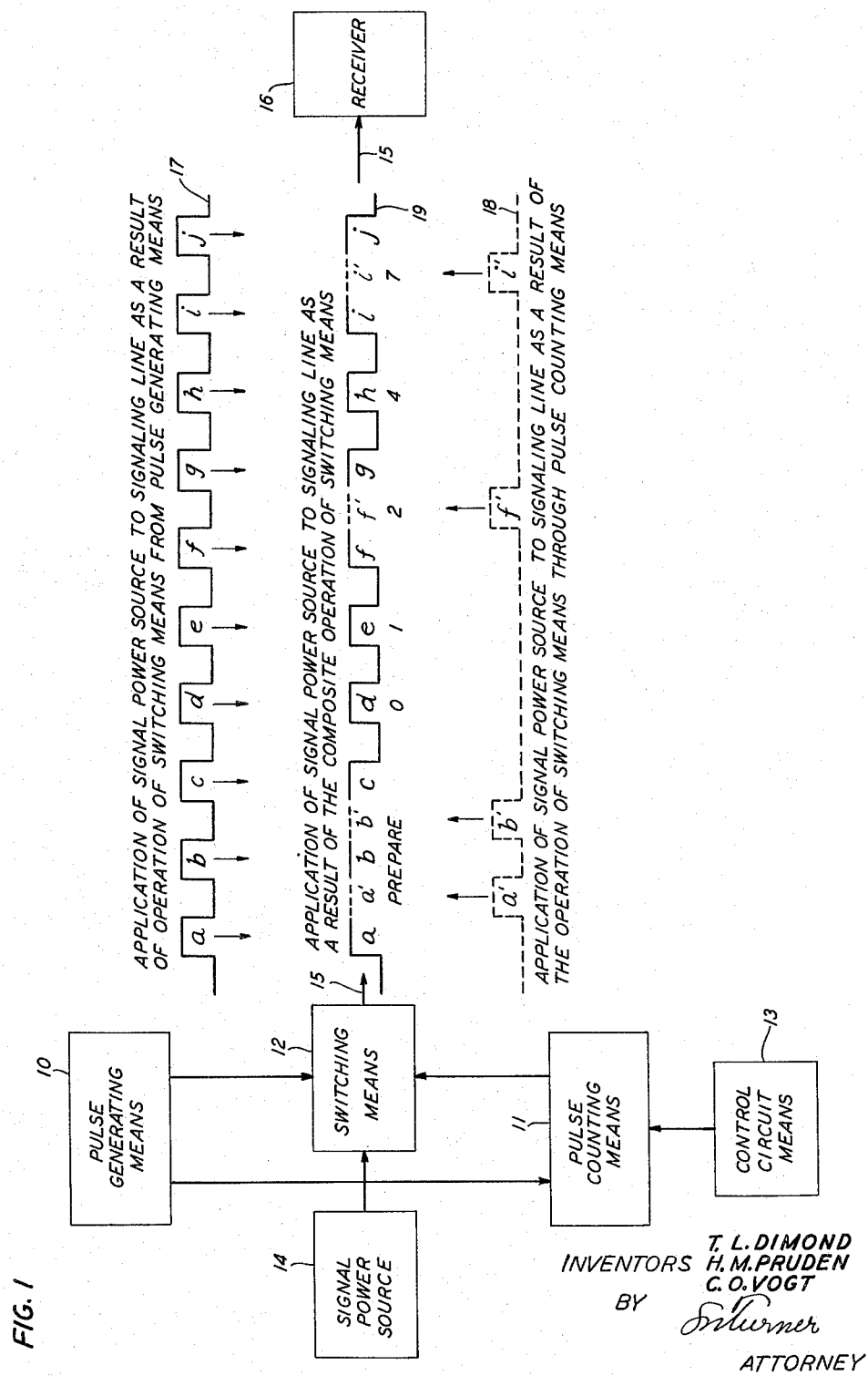

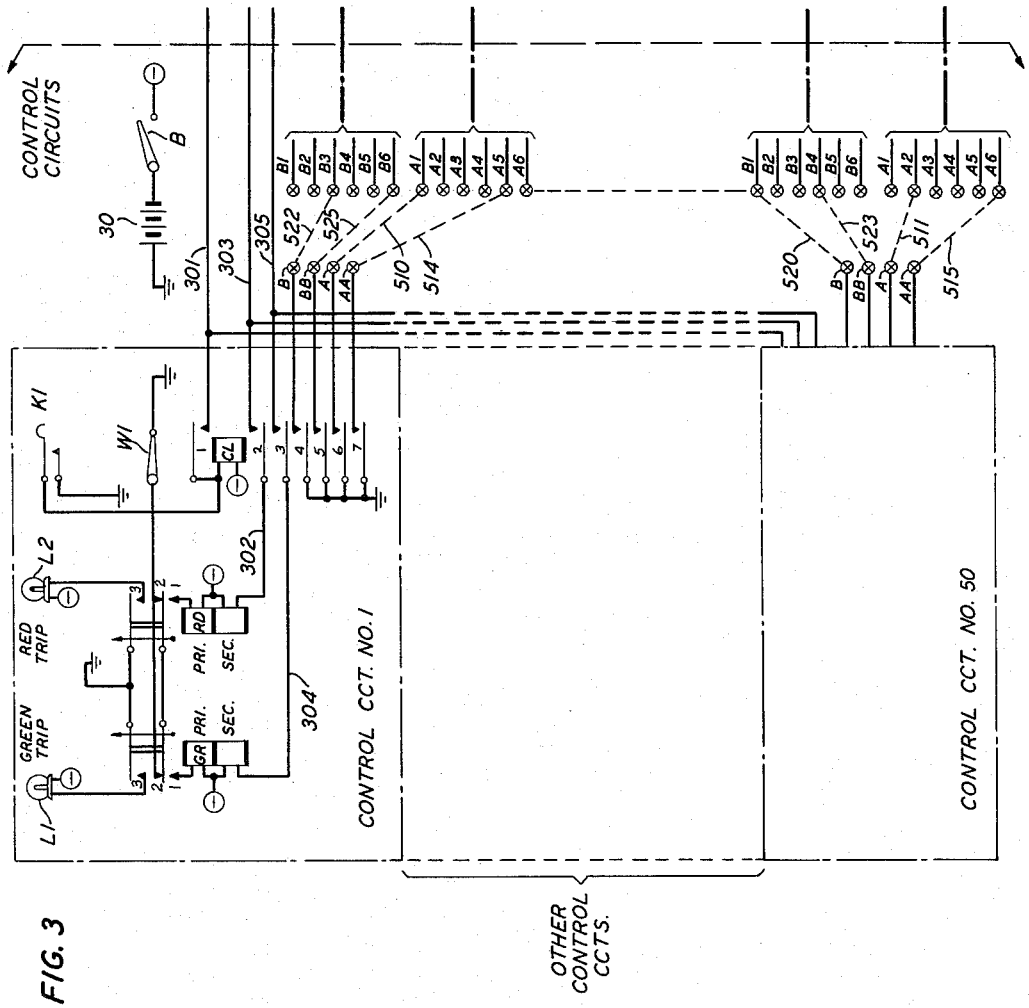

INVENTORS T. L. DIMOND
H. M. PRUDEN
C. O. VOGT
BY
ATTORNEY

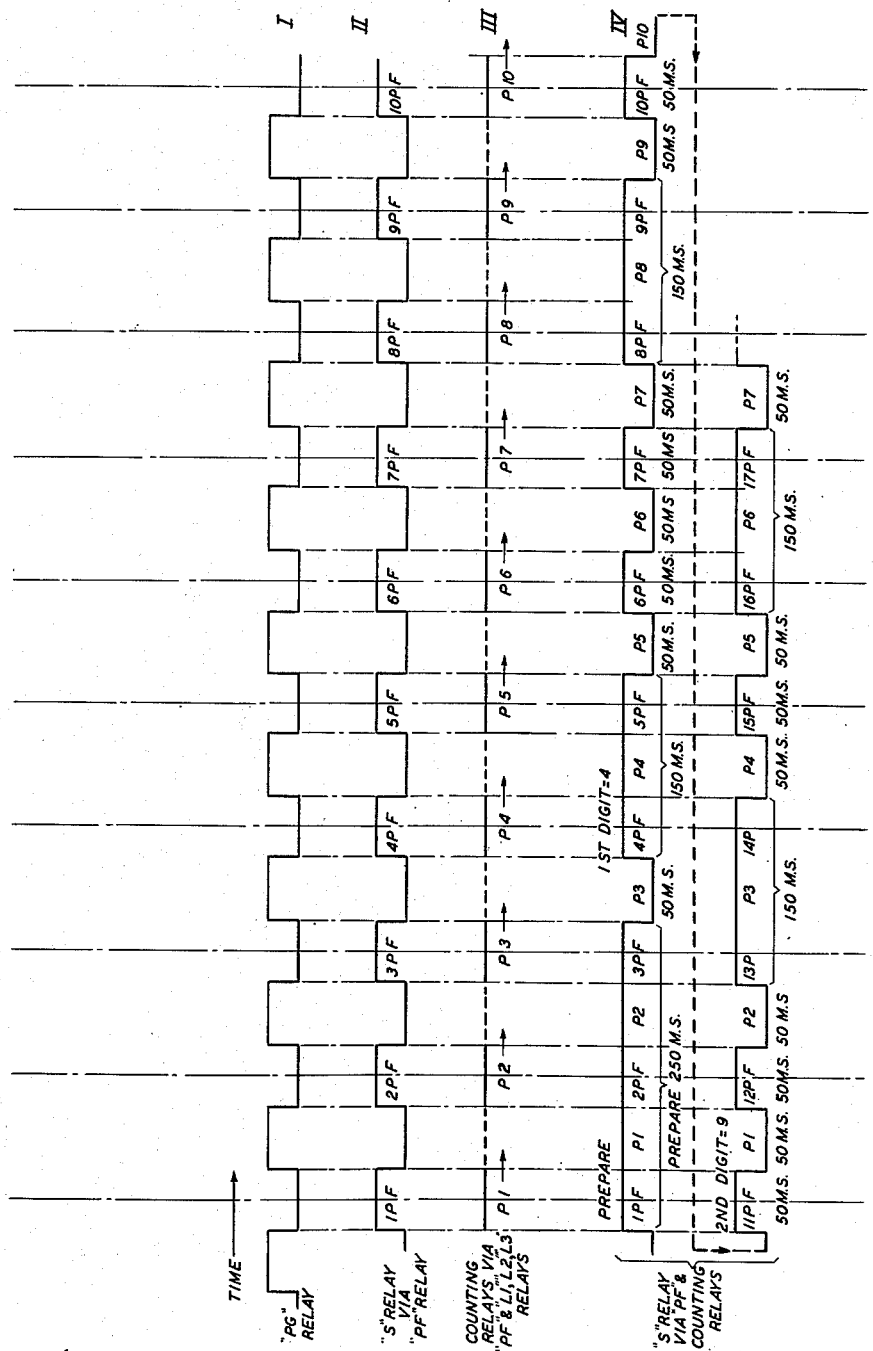

United States Patent Office 2,996,704
Patented Aug. 15, 1961

2,996,704
METHOD OF AND APPARATUS FOR GENERATING CODED SIGNALS
Thomas L. Dimond, Rutherford, and Harold M. Pruden, Maplewood, N.J., and Calvin O. Vogt, Augusta, Ga., assignors to Bell Telephone Laboratories, Incorporated, New York, N.Y., a corporation of New York
Filed Jan. 19, 1956, Ser. No. 560,160
6 Claims. (Cl. 340—353)

This invention relates generally to selective signaling systems and more particularly to methods of and circuits for generating preselected combinations of varied length pulses.

In the past the generation of varied length pulses for purposes of coding inquiries to remotely disposed stations over a two-wire signaling line has been performed in a variety of ways. The more common means, however, have generally been mechanical. That is to say, various length pulses have been obtained by the use of a mechanical timer preselectable to generate a pulse of a desired duration. The necessity for using such mechanical timing means to obtain a combination of different length pulses has generally required an expensive timing component as well as the necessary circuitry associated therewith.

The present invention obviates many of the difficulties encountered in generating pulses of different lengths by the use of elaborate timing circuits. This is accomplished, according to the instant invention, by providing control means operable in conjunction with pulse counting means to bridge preselected pulses generated by a pulse generating means in order to obtain permutations of long and short pulses.

Therefore, an object of the present invention is to provide simple and efficient means for generating a pulse length code without the use of elaborate timers and timing circuits.

Another object of the invention is to provide a method for generating pulses of different time durations and in preselected combinations.

Yet another object of the invention is to employ a simple circuit to obtain unique pulse length codes without requiring components of critical values.

A general feature of the invention relates to means for generating a plurality of pulses and for bridging preselected consecutive ones of said pulses to form a unique pulse length code.

Another feature of the invention relates to means for controlling switching means over a principal and an alternate operating path for placing pulses on a signaling line in a manner designed to form unique pulse length codes.

Yet another feature of the invention resides in the combination of pulse generating means for generating a series of pulses, multistate counting means, circuit means responsive to the series of pulses to cause the counting means to assume a different state for each pulse of the series of pulses, and means operable under the control of a preselected state of the counting means to cause the generating means to lengthen the instant generated pulse.

More specifically, a feature of the invention relates to the combination of a signaling line, a pulsing relay and means for repetitively operating and releasing it, a relay counting chain responsive to each operation of the pulsing relay, a source of power, a sender relay operable in response to the operation of the pulsing relay to place a pulse of power upon the signaling line whenever the pulsing relay is operated, and means controlled by the counting chain at preselected times for holding the sender relay operated between operations of the pulsing relay.

These and other objects and features of the invention may be more readily understood from the following detailed description when read in conjunction with figures in which:

FIG. 1 is a block diagram schematic representing the over-all signal generating circuit as embodied in the present invention;

FIG. 2 illustrates the proper orientation of FIGS. 3 through 6;

Figure 4:
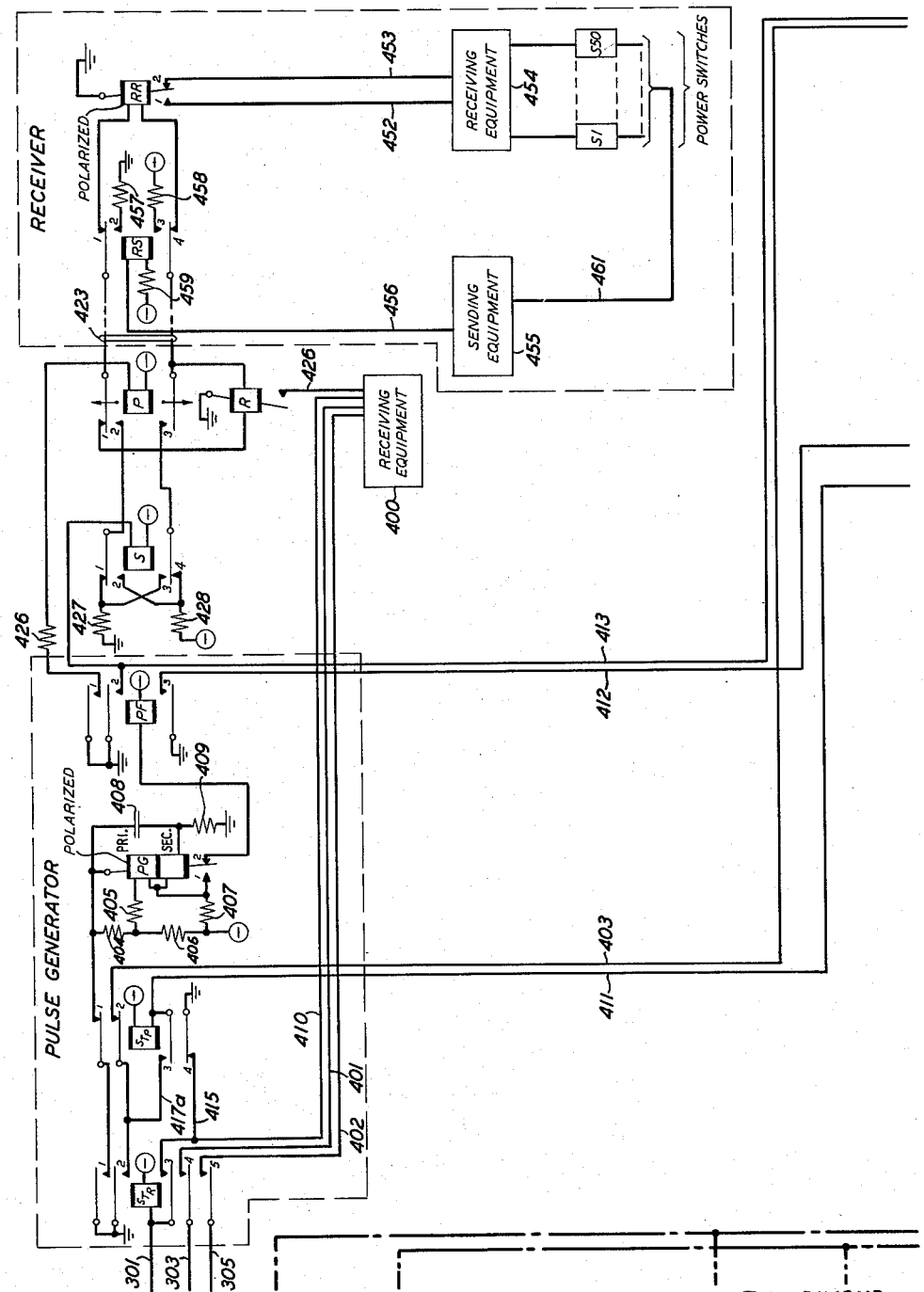
Figure 5:
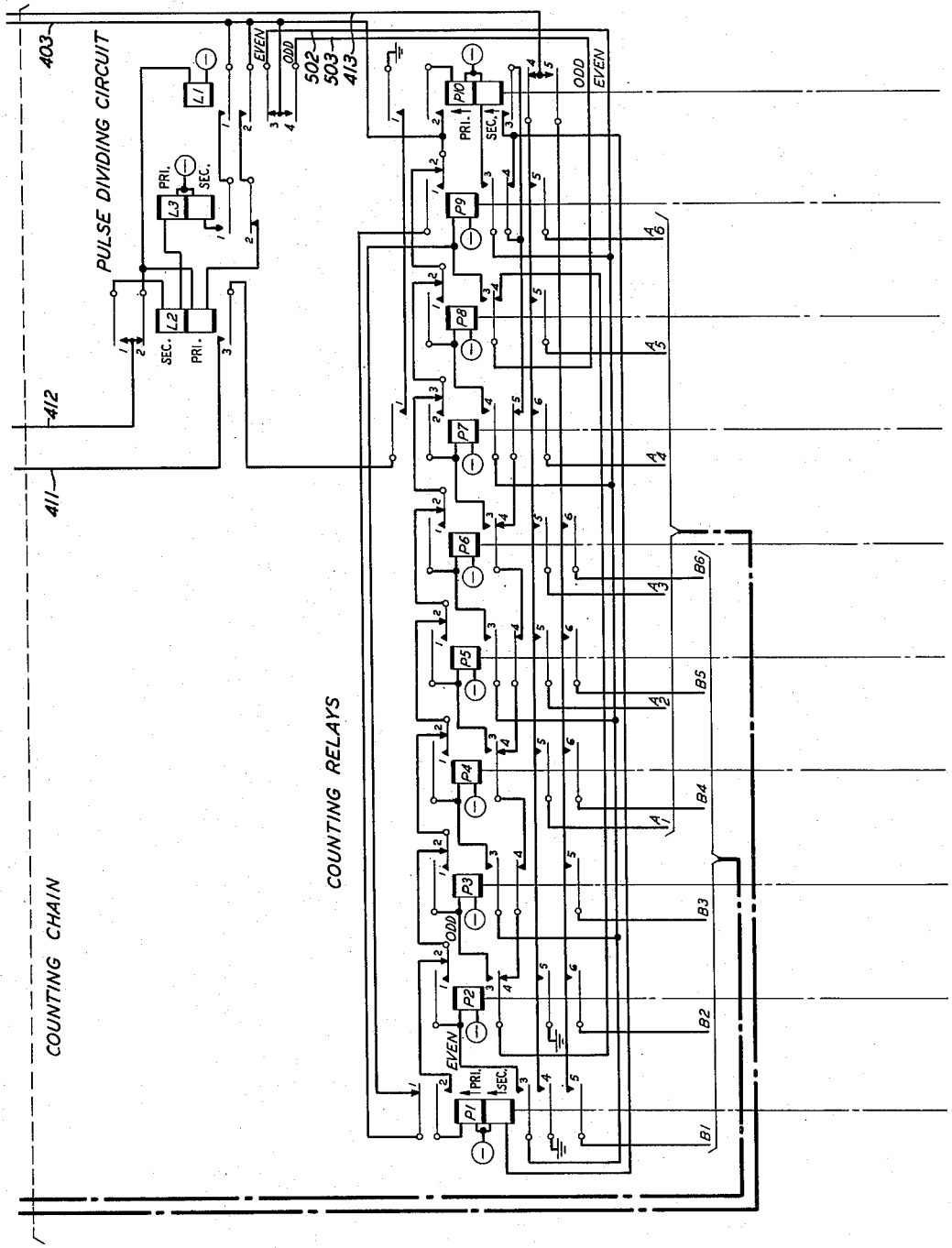

FIGS. 3 through 5, oriented in accordance with FIG. 2, constitute a complete disclosure of a selective signal generator embodying the invention; and FIG. 6 illustrates along integrated time axes the functioning of some of the various relays necessary to produce a preselected pulse length code.

GENERAL DESCRIPTION

Before considering the over-all circuit as disclosed in FIGS. 3 through 5, it will be beneficial to consider FIG. 1 wherein the over-all system is schematically represented by box diagrams. The over-all system includes principally pulse generating means 10, pulse counting means 11, control circuit means 13, switching means 12, a signal power source 14, and a signaling line 15. The signaling line 15 interconnects the signal power source 14 to a receiver 16 whenever the switching means 12 is operated.

The pulse generating means 10 generates a series of roughly equispaced pulses with their time width roughly equal to the time width of their absence. The pulse generating means 10 operates the switch means 12 with each pulse generated; as a result, the switching means 12 is a "slave" to the pulse generating means 10. Hence, each pulse of the pulse generating means 10 operates the switching means 12 which in turn places the signal power source 14 on the signaling line 15 to be transmitted to a remote receiver 16.

Pulses from the pulse generating means 10 also apply operating ground to the pulse counting means 11. Under this arrangement, the state of the counting means is changed each time a pulse is generated by the pulse generating means 10, or what is the same thing, each time switching means 12 is operated. The pulse generating means 10, therefore, causes the switch means 12 to place signal power source 14 on signaling line 15 to form a number of short equispaced pulses and, at the same time, steps the counting means 11.

The control circuit means 13, depicted in FIG. 1, is preselectable to code certain sequences of pulses to form a pulse length code. The control circuit means 13 comprises a plurality of individual control circuits, each of which provides operating ground to switching means 12 through a different combination of preselected states of the counting means 11 thereby, in effect, to allow preselection of the pulse length code to be generated for application to the signaling line 15. In accordance with the illustrative code, depicted on FIG. 1, if it is desired to send a long Prepare pulse followed by the digit 9 (based on a two-out-of-five pulse length code), the control circuit chosen will be one which provides an operating ground for switching means 12 between the periods during which it is operated by the pulse generating means 10, which periods correspond to the disposition of the Prepare pulse and digit 9 along the time axis.

The application of signal power source 14 to the signaling line 15, which results from the operation of the switching means 12 by the pulse generating means 10 and by selected control circuit means 13, acting through the pulse counting means 11, produces the Prepare pulse followed by the digit 9 shown on FIG. 1 as the composite operation 19. Assuming the Prepare pulse is to equal, in duration, the equivalent of five pulses generated by the pulse generating means 10, it is obtained by holding the switching means 12 operated over what normally would be its first two inoperative states (between pulses

*a* and *b*, and *b* and *c*, which are placed on the signaling line 15 as a result of the operation of switching means 12 by pulse generating means 10 alone). This normal operation of switching means 12 to apply signal power source 14 to the signaling line 15 is shown on signal time axis 17. When these two normally unoperated conditions occur along the signal time axis 17, the preselected control circuit provides an alternate ground through the instant operated position of the counting means 11 to maintain the switching means 12 operated. Thus, switching means 12 allows signal power source 14 to apply pulses *a'* and *b'* (on time axis 18 representing times during which switching means 12 is maintained operated by alternate ground supplied by counting means 11) to signaling line 15. Following the Prepare pulse, the switching means 12 is controlled solely by the pulse generating means until an alternate ground next appears.

Just after the deenergization of the switching means 12 following pulse *f* (see time axis 17) the switching means 12 is held operated (to place pulse *f'* on the signaling line 15) by an alternate operating ground from the preselected control circuit means 13 through the instant state of the counting means 11. The holding circuit for switching means 12 is thereafter switched back to pulse generating means 10 and pulse *g* is applied to signaling line 15. This provides a long pulse three times the time duration of a short pulse, which corresponds to the third position in a two-out-of-five (0—1—2—4—7) code. The long pulse 7 (see time axis 19), corresponding to the fifth position in the two-out-of-five pulse length code, is obtained by holding switching means 12 operated between pulses *i* and *j* (see time axis 17) by providing an alternate holding ground during the time interval of pulse *i'* (see time axis 18) just as was done between pulses *f* and *g* to form the first long pulse in the two-out-of-five code.

In capsulating the philosophy of this circuit for generating a pulse length code, a series of short pulses are placed on a signaling line and preselected consecutive ones of the short pulses are bridged at the proper time and in the proper sequence through an alternate enabling path for the pulse applicator. The counting means assumes a unique state for each operation of the pulse generating means, and provides the alternate holding ground.

The signaling circuit is not restricted, of course, to a pulse length code generator utilizing only two discrete length pulses (i.e., long and short ones). By providing additional control circuits (to provide alternate operating grounds for the switching means), an infinite number of combinations and permutations of varied length pulses can be formed to operate many more receivers. Under such an arrangement, the only real limitation, within the philosophy herein illustrated, is that the lengths of the pulses must be integers unless the pulse generating means provides pulses and spaces of varying lengths. The number of pulses and/or their respective durations for any particular code permutation may require a number of additional unique states in the counting means and may require additional control circuits to be used in cooperation therewith, but otherwise the possibilities are practically unlimited.

DETAILED DESCRIPTION

In looking at the composite circuit schematic embodied in FIGS. 3 through 5, it can be seen that the control circuits, depicted in FIG. 1 as a single box are shown in more detail in FIG. 3, and that the pulse generating means, switching means, and receiver, briefly described in FIG. 1, are shown in more detail in FIG. 4. A nondetailed representation of the receiving equipment at the pulse generating station, for the purposes of receiving information directed to it from a remote station, is also depicted in FIG. 4. FIG. 5 includes the pulse counting means employed, i.e., a pulse divider circuit and conventional relay counting chain.

FIG. 6 comprises a plurality of integrated time axes. The states of certain relays in the circuit, at any instant along a linear time axis, are synchronized to illustrate the manner in which the Prepare pulse and digits 4 and 9 are obtained, as will be more carefully explained hereinafter.

From the standpoint of simplicity, the presence of battery 30, wherever needed in the circuit embodying the present invention, is denoted by a circle with a minus sign enclosed therein. This application of negative battery 30 (positive terminal grounded) to all leads where the minus sign enclosed by a circle is shown takes place whenever master battery switch B (FIG. 3) is closed. This switch is closed before any control circuit is selected for producing a preselected pulse length code.

Control circuits

FIG. 3 displays only one of the control circuits in detail, it being apparent that a plurality of other combinations of long and short pulses forming two-out-of-five codes may be envisioned and included in the control circuits 2 through 50 (not shown). The particular control circuit No. 1, which is fully disclosed, is designed to condition the pulse counting means and in turn the switching means to send a Prepare pulse followed by the digits 4 and 9.

Control circuit No. 1 comprises a start key K1, relays GR, RD and CL, and green lamp L1 and red lamp L2. Once switch B is operated, operating ground is supplied to the pulse generator by the momentary operation of the start key K1. The closure of start key K1 completes a circuit for relay CL from ground through the start key K1 and through the winding of relay CL to negative battery. Relay CL, in operating, supplies ground to start relay STR in the pulse generator. Hence, an operating circuit for relay STR is completed from ground over start key K1, make contact 1 of relay CL, lead 301 and through the coil of relay STR to negative battery.

Relay CL operates relay STR and also prepares an operating path for relay RD through make contact 2 of relay CL, for relay GR through make contact 3 of relay CL, and further, by operating, it places ground on coding lead terminals B, BB, A and AA through its make contacts 4, 5, 6 and 7, respectively. These terminals are connected through cross-connections 522, 525, 510 and 514, respectively, to other terminals in FIG. 3 connecting by conductors to the counting chain of FIG. 5. These cross-connections of FIG. 3 code the counting chain of FIG. 5 for its part in the generation of the preselected digits 4 and 9. If other digits were to be generated, rather than the ones proposed for control circuit No. 1, coding terminals A, AA, B and BB would be connected to different ones of the other terminals (associated with conductors A1 through A6 and B1 through B6) associated with the counting chain (FIG. 5). For example, the leads from control circuit No. 50 are shown connected to conductors A2, A6, B1 and B4, respectively, which would prepare the counting chain for controlling the sending relay to generate digits 8 and 2. Other combinations of ground to these leads would produce other pulse code combinations.

The green and red lamps L1 and L2, associated with control circuit No. 1, are provided to display information received from a remote receiver after it has been enabled by receiving the unique code assigned to it. In the signal generating circuit disclosed in the present invention, no specific provisions are made for sending orders to remote receiving stations or for obtaining information therefrom, but the lamps L1 and L2 are provided to illustrate how information received from a remote station can be displayed at the main station or signal generating source. These lamps are operative by the energization of their cooperating relays, GR and RD as hereinafter described, to provide a constant visual and preidentified signal based on a particular state or condition of the remote station. Once either relay GR or RD is operated it locks operated to maintain lighted the particular lamp associated therewith. Switch W1, depicted in the control circuit No. 1, may be opened to interrupt the locking path whenever the circuit is to be disabled.

As was pointed out above, the operation of relay CL in control circuit No. 1 causes relay STR in the pulse generator (FIG. 4) to operate which permits the pulse generator to start functioning. The operation of the STR relay initiates a number of operations. For one thing, it completes circuits for the GR and RD relays from negative battery to the receiving equipment 400, depicted as a box in FIG. 4. With this circuit completed, either the RD or GR relay may be operated (by the application of ground to lead 401 or 402) whenever the proper type of signal is received from the remote receiver. The circuit prepared for relay RD extends from negative battery, through the secondary winding of relay RD, over lead 302, make contact 2 of relay CL, lead 303, make contact 4 of relay STR, and lead 401 to the receiving equipment 400. The circuit prepared for relay GR extends from negative battery through the secondary winding of relay GR, over lead 304, make contact 3 of relay CL, lead 305, contact 5 of relay STR, and lead 402 to the receiving equipment 400.

*Pulse generating circuit*

Relay STR, when operated over lead 301, is provided with a lockup path through its front contact 3 and back contact 4 of relay STP to ground. When start key K1 is released, relay STR remains operated as long as relay CL, which utilizes the same holding ground through its make contact 1, remains operated and as long as relay STP remains unoperated. With the holding ground for relays CL and STR dependent upon the non-operation of the stop relay STP, means are provided for deenergizing the entire circuit whenever the relay STP is operated. Relay STP is operated by a certain condition of the counting chain, to be described hereinafter in detail, which places ground on lead 411.

In addition to previously mentioned functions, relay STR, in operating, places ground on the armature of the polarized pulse generating relay PG and on lead 403 which terminates in the pulse dividing circuit of FIG. 5. The former circuit path is traced from ground over make contact 1 of relay STR and back contact 1 of relay STP to the armature of relay PG. The latter ground is traced over make contact 2 of relay STR and back contact 2 of relay STP to lead 403.

The application of ground to the armature of relay PG completes a circuit through the upper or primary winding of relay PG which extends from ground at its armature, through resistors 404 and 405, the primary winding of relay PG, and resistor 407 to negative battery. The energization of the primary winding of relay PG tends to operate the armature of relay PG to its make contact 1. However, before the primary winding of relay PG is energized by the appearance of ground on the armature of relay PG, the armature is held against back contact 2 as a result of the energization of the lower or secondary winding in a circuit extending from ground through resistor 409, the secondary winding of relay PG, resistor 407 to negative battery. As soon as the primary winding of relay PG is energized, as a result of the operation of relay STR, the armature of relay PG tends to move towards its make contact 1, thereby to overcome the effect of the counteracting secondary winding. The superiority of flux generated by the primary winding of relay PG, which overcomes the oppositely poled flux generated by the secondary winding, is thwarted from doing so immediately because an additional surge of current flows through the secondary winding of relay PG to charge capacitor 408 at the instant ground is placed on the armature of relay PG. This surge current path extends from negative battery through resistance 407, the secondary winding of relay PG, and capacitor 408 to ground at the armature of relay PG. The flux resulting from the surge current overwhelms the flux generated by the current flowing through the primary winding of relay PG until capacitor 408 is charged. When capacitor 408 becomes substantially fully charged, the surge current flow is substantially reduced and the overriding effect of current flowing through the primary winding operates the armature of relay PG to its front contact 1.

When the armature of relay PG engages make contact 1 it removes the previous circuit including the primary winding of relay PG and substitutes therefor a circuit which is traced from ground at the armature of relay PG, over its front contact 1, through the primary winding of relay PG, resistance 405 and resistance 406 to negative battery. This substituted circuit, including the primary winding of relay PG, has a polarity opposite to that of its predecessor which caused relay PG to operate initially. Hence, when the armature of relay PG engages front contact 1 and the polarity of the primary winding circuit is reversed, the tendency is for relay PG to release. This it does not do immediately, however, because a discharge path for capacitor 408 is provided through the secondary winding of relay PG with a polarity counteracting that of the substituted circuit embracing the primary winding of relay PG. This discharge path, which may be traced from ground on the armature of relay PG through its make contact 1, the secondary winding of relay PG, and capacitor 408 to ground (again at the armature), when closed, provides a surge of current through the secondary winding which overrides the tendency of the substituted circuit current through the primary winding of relay PG to release the relay. As soon as the initial surge has decreased somewhat, the current flowing through the primary winding causes relay PG to release, whereupon its armature reengages back contact 2.

Upon reengagement of back contact 2 by the armature, the relay PG repeats the cycle previously described. The values of the variously identified resistors, capacitors, and windings of relay PG are so chosen to allow relay PG to operate to its front contact 1 approximately ten times a second. It is, of course, obvious that these parameters could be changed to provide a faster or slower pulse repetition rate.

The pulsing of relay PG is diagrammatically indicated along time axis I in FIG. 6. Observing this time displaced representation of the functioning of relay PG, it may be appreciated that the times during which the armature of relay PG is against its make contact 1 (relay operated) are depicted as square pulses of approximately 50 milliseconds duration, whereas the times during which the armature of relay PG is against break contact 2 (relay released) are represented by the troughs between the square pulses.

Each time relay PG is in its released condition (armature engaging back contact 2), an operating circuit for the pulse following relay PF is completed. This circuit extends from ground over make contact 1 of relay STR, back contact 1 of relay STP, back contact 2 of relay PG, and through the winding of relay PF to negative battery. In such a situation, relay PF operates each time relay PG releases and therefore acts as a "pulse follower" or "slave" relay to releases of relay PG. Relay PF, in operating, completes circuits for the sending relay S and line enabling relay P. It also provides an enabling ground over lead 412 for the pulse dividing circuit (FIG. 5). The circuit including the sending relay S extends from ground over make contact 2 of relay PF and through the winding of relay S to negative battery. The circuit for operating relay P extends from ground over make contact 1 of relay PF, through resistance 426, and through the winding of relay P to negative battery.

The operation of relay P removes the signaling line 423 from across the winding of the receiving relay R and connects contacts associated with the sending relay to the signaling line 423. Relay P is slow to release, and hence is held operated during the periods in which relay PF is deenergized, provided the interval is not too great. During the operation of the circuit for generating a pulse length code, relay P is maintained operated over the complete cycle.

Before relay P is first operated, a circuit is completed from the upper side of signaling line 423, over back contact 1 of relay P, through the winding of receiving relay R, and back to the lower side of signaling line 423. With this circuit completed, any signals from a remote station, such as that one illustrated in FIG. 4, operate relay R thereby bringing its armature in contact with its make contact to supply ground to the receiving equipment 400 over lead 426. The receiving equipment 400 can then, having properly interpreted the received information (circuit not shown), transmit appropriate grounds over leads 401, 402 and/or 410 for either the display of proper information on the control circuit's panel (i.e., light lamp L1 or L2) or the provision of an auxiliary holding ground for relays CL and STR, said holding ground being independent of the condition of relay STP.

Whenever it is desired to place a pulse length code on signaling line 423, the operation of relay P, as previously described and its holdover during normal releases of relay PF, disconnects the receiving equipment 400 from the signaling line 423 and connects thereto certain contacts associated with the sending relay S.

With relay P operated and relay S released, a circuit is completed to the remote station receiver from ground through the resistance 427, over back contact 1 of relay S and make contact 2 of relay P to the upper side of signaling line 423, and from the lower side of signaling line 423 over make contact 3 of relay P, back contact 4 of relay S, and through resistance 428 to negative battery. This circuit is completed each time relay S is released. Each time relay S is operated, as a result of the operation of relay PF, the negative battery is switched through make contact 2 of relay S to the upper side of signaling line 423 which is grounded when relay S is released, and the ground which had been on the upper side of the signaling line is switched through make contact 3 of relay S to the lower side of the signaling line 423, which lower side had negative battery thereon when relay S was released. Therefore, a series of pulses are placed on signaling line 423 by reversing the battery and ground leads as they are placed on each side of the signaling line 423. This provides a series of pulses as depicted along the time axis II on FIG. 6. Since the representation of the functioning of the PG and S relays are integrated along the time axis, by referring to FIG. 6, it can be seen that relay S places a positive pulse (upward in FIG. 6) on the signaling line each time the pulse generating relay PG is released.

*Pulse dividing circuit*

As was previously pointed out, the operation of relay PF not only completes an operating path for relay S, but also provides a ground for the pulse dividing circuit comprising relays L1, L2 and L3 of FIG. 5. This ground is traced over make contact 3 of relay PF and lead 412 to back contact 2 of relay L2. From back contact 2 of relay L2 the ground is supplied to one side of the winding of relay L1. The other side of the L1 relay winding is connected to negative battery.

The pulse dividing circuit is designed to place ground alternately on the Even and Odd leads 502 and 503, respectively, in order to drive the relay counting chain comprising relays P1 through P10. This is the means utilized to distinguish the start and end of each pulse for a counting chain thereby to prevent the counting chain from "running" whenever ground is supplied thereto. At the same time that sending relay S operates to place the first pulse on signaling line 423, ground is supplied to the winding of relay L1 in the pulse dividing circuit over the path previously described.

Relay L1, in operating, transfers the ground present on lead 403 (as a result of the operation of relay STR) from the Even lead 502 (over break contact 3 of relay L1) to the Odd lead 503 (over make contact 4 of relay L1). This ground continues to be supplied to Odd lead 503 until sending relay S operates to place the second pulse on signaling line 423, at which time relay L1 releases and retransfers the ground on Odd lead 503 to Even lead 502. The leading edge of the third pulse placed upon signaling line 423 (by the operation of relay S) is accompanied by the switching of ground back again to the Odd lead 503. In this manner the beginning of each adjacent pair of pulses placed on signaling line 423 coincides with the alternate placement of ground on Odd and Even leads 503 and 502, respectively.

Relay L1, in operating, also prepares a holding circuit for relay L3 from ground (on lead 403) over make contact 1 of relay L1 to the armature of relay L3 associated with make contact 1. In addition to this, the operated relay L1 places ground (from lead 403) at one side of the primary winding of relay L2 (over make contact 2 of relay L1 and break contact 2 of relay L3). Relay L2 cannot operate, however, as long as ground is applied from lead 412 over back contact 2 of relay L2 to the upper side of the primary winding because the winding is thus shunted to ground. But, when relay PF releases, thereby removing ground potential from lead 412, the instant operating circuit of relay L1 is opened and the ground at the upper side of the primary winding of relay L2 is removed. Relay L2 is thereupon able to operate in series with relay L1, which thus remains operated.

The operating circuit for relay L2 extends from ground on lead 403 over make contact 2 of relay L1, break contact 2 of relay L3, through the primary winding of relay L2, and through the winding of relay L1 to negative battery. This circuit also maintains relay L1 operated after ground is interrupted to lead 412, which opens the initial operating circuit of relay L1.

The operation of relay L2 on its primary winding also completes a circuit path from the lower side of the winding of relay STP, over lead 411 and over make contact 3 of relay L2, to the armature associated with contact 1 of relay P7 in the counting chain, which circuit path when grounded operates relay STP to disable the signal generating circuit, as will be described in more detail infra.

The next operation of relay PF, which again places ground on lead 412, as previously described, completes a circuit for the secondary winding of relay L2 and the primary winding of relay L3. This circuit is traced from ground on lead 412, over front contact 1 of relay L2, through the secondary winding of relay L2, and through the primary winding of relay L3 to negative battery.

Relay L3, in operating, completes a holding circuit through its secondary winding over its make contact 1, and make contact 1 of relay L1 to ground on lead 403. Relay L3, in operating, also interrupts the circuit including the primary winding of relay L2 and the winding of relay L1 by virtue of break contact 2 of relay L3 disengaging its armature. This interruption causes relay L1 to release.

Relay L1, in releasing, switches the ground on lead 403 from the Odd lead 503 (over make contact 4) to the Even lead 502 (over break contact 3). Relay L1, in releasing, also interrupts (at its make contact 1) ground from the secondary winding of relay L3 thereby causing relay L3 to release. At this point the pulse dividing circuit has been restored to its original condition. The next two operations of relay PF cause the pulse dividing circuit to recycle in a similar manner and this continues with each two successive operations of relay PF until the over-all signaling circuit is disabled.

The application of ground alternately to Odd lead 503 and Even lead 502 drives the counting chain one step for each operation of relay PF or, what is the same thing, one step for each application of a short pulse to signaling line 423 by the operation of sending relay S.

*Counting chain circuit*

The operation of the counting chain, as a result of the application of ground alternately to Odd lead 503 and Even lead 502, will first be explained without considering its cooperation with the various control circuits to operate sending relay S in time sequences determined by the preselected pulse length code chosen. After the operation of the counting chain is explained purely as a counting chain, its operation will be integrated with the application of ground to the preselected coded leads A1 through A6 and B1 through B6 which are selectively interconnected to certain ones of the A, AA, B and BB terminals of the control circuits (FIG. 3) through the agency of the cross-connections of FIG. 3.

The initial presence of ground on Odd lead 503 completes a circuit including the secondary winding of relay P1 which may be traced from lead 503 over back contact 4 of relay P8, back contacts 4 of relays P2 through P6, back contact 5 of relay P7, back contact 4 of relay P9, and through the secondary winding of relay P1 to negative battery. The closure of this circuit operates relay P1 which, when operated, is locked up by a holding circuit including its primary winding, which circuit may be traced from negative battery, through the primary winding of relay P1, over its make contact 2, break contacts 2 of relays P2 through P6, break contact 3 of relay P7, break contacts 2 of relays P8 and P9, lead 403, break contact 2 of relay STP, and make contact 2 of relay STR to ground.

Relay P1, in operating, connects Even lead 502 through make contact 3 of relay P1 to the winding of relay P2, thereby preparing an operating path for relay P2 when ground is applied to Even lead 502.

The second operation of relay PF, acting through the pulse dividing circuit, places Even lead 502 at ground potential. When ground appears on Even lead 502, it completes an operating circuit for relay P2 which extends over make contact 3 of relay P1, through the winding of relay P2 to negative battery. The operation of relay P2 interrupts at its contact 2 the locking circuit including the primary winding of relay P1 and transfers the locking circuit to the winding of relay P2 through make contacts 1 of relay P2. As can be observed, this transfer of the locking or holding circuit from relays P1 to P2 is accomplished through a make-before-break transfer, thereby assuring the completion of the locking circuit for relay P2 before it is broken for relay P1. The operation of relay P2 also prepares an operating path over its make contact 3 for relay P3.

When ground is next switched from Even lead 502 to Odd lead 503 a circuit is completed including the winding of relay P3. This circuit extends from ground at lead 503 over back contact 4 of relay P8, front contact 3 of relay P2 and through the winding of relay P3 to negative battery. The operation of relay P3 shifts the previously described locking path from the winding of relay P2 to the winding of relay P3, again by the use of a make-before-break transfer contact arrangement associated with relay P3. The operation of this relay also prepares an operating path over its make contact 3 for relay P4.

The reappearance of ground on Even lead 502 completes the operating circuit for relay P4 which extends from ground on lead 502, over make contact 3 of relay P3, and through the winding of relay P4 to negative battery. The operation of relay P4, in a manner similar to that following the operation of relay P3, switches the locking circuit for the counting chain from the winding of relay P3 to the winding of relay P4 and also prepares a path for the application of ground to relay P5 when it next appears on Odd lead 503.

The application of ground on Odd lead 503 completes the operating circuit for relay P5 extending over back contact 4 of relay P8, lead 531, back contacts 4 of relays P2 and P3, front contact 3 of relay P4 and through the winding of relay P5 to negative battery. The operation of relay P5 prepares a path for the operation of relay P6 when ground next appears on Even lead 502 and also transfers the counting chain locking circuit from the winding of relay P4 to the winding of relay P5 in a manner similar to that for prior relays P2 and P3.

The next ground on Even lead 502 is applied to one side of the winding of relay P6 over make contact 3 of relay P5. The other side of the winding of relay P6 is connected to negative battery. The completion of this circuit causes relay P6 to operate and, in a manner similar to that of the relays which preceded it, to transfer the counting chain's locking circuit from the winding of relay P5 to the winding of relay P6 and to prepare an operating path for relay P7.

As ground next appears on the Odd lead 503, a circuit is completed for relay P7 extending from ground over back contact 4 of relay P8, back contacts 4 of relays P2 through P5, front contact 3 of relay P6, and through the winding of relay P7 to negative battery. Relay P7, in operating, transfers the locking circuit from the winding of relay P6 to the winding of relay P7 and also prepares an operating path over make contact 4 of relay P7 for relay P8.

The next presence of ground on Even lead 502 completes a circuit for relay P8 from ground on lead 502 over make contact 4 of relay P7 and through the winding of relay P8 to negative battery. Relay P8, in operating, transfers the locking circuit from the winding of relay P7 to the winding of relay P8 and connects one side of the winding of relay P9 through make contact 3 of relay P8 to Odd lead 503, whereby the next application of ground to the Odd lead 503 completes a circuit including the coil of relay P9 to negative battery.

The operation of relay P9 interrupts the previous locking circuit for relay P8 and substitutes therefor a locking circuit for the winding of relay P9 extending over back contact 1 of relay P1, and make contact 1 of relay P9 to ground on lead 403. Relay P9, in operating, also prepares over its control 3 an operating path for the secondary winding of relay P10.

The succeeding application of ground to Even lead 502 completes the operating circuit for relay P10 which extends from ground on lead 502, over make contact 3 of relay P9 and through the secondary winding of relay P10 to negative battery.

Relay P10, in operating, locks up through its make contact 2 and primary winding to lead 403, which is maintained at ground potential during the operated and released condition of relays STR and STP, respectively. The completion of the locking path including the primary winding of relay P10 does not interrupt the locking circuit previously described and which includes the winding of relay P9. Further, however, the operation of relay P10 prepares at its contact 3 an operating path for relay P1 to be completed on the next application of ground to Odd lead 503.

When ground next appears on Odd lead 503 the circuit including the secondary winding of relay P1 is completed and may be traced from Odd of lead 503 over back contact 4 of relay P8, back contacts 4 of relays P2 through P6, back contact 5 of relay P7, front contact 3 of relay P10, and through the secondary winding of relay P1 to negative battery. The operation of relay P1 interrupts the holding path for relay P9 at back contact 1 of relay P1, prepares an operating path for relay P2 (as described supra), and locks up through make contact 2 of relay P1 to lead 403 (as previously described).

The counting chain repeats the steps previously described, as ground is alternately placed on Odd lead 503 and Even lead 502. However, it is to be noted that relay P10 does not release upon the second operation of relay P1 as does relay P9, but remains locked up through its front contact 2 to the ground on lead 403. After ground on Odd lead 503 operates relay P7 for the second time, a result occurs which is different from that previously described. Relay P7, upon operating, completes an operating circuit for relay STP. This circuit is traced from ground over front contact 1 of relay P10 (relay P10 has remained operated), front contact 1 of relay P7, front contact 3 of relay L2 (operated after relay PF next releases), lead 411, and through the winding of relay STP to negative battery.

The operation of relay STP interrupts the ground applied via lead 403 to the counting chain and interrupts the circuit path for applying ground to the armature of relay PG. The operation of relay STP also interrupts the locking circuit for relays CL and STR. As a result of these happenings, upon the operation of relay STP, the signaling circuit is disabled until start key K1 is again momentarily operated to initiate a repeat operation.

The operation of relays P1 through P10 in the counting chain is illustrated along time axis III in FIG. 6. This axis is correlated with time axes I and II representing the repetitive operation and release of relays PG and PF. It will be observed that a succeeding relay in the chain is operated each time relay PF operates. For example, when relay PF is operated during the interval designated 1PF, relay P1 is operated in the counting chain; when relay PF is operated during the interval designated 2PF, relay P2 is operated, etc. Each relay in the counting chain, after operation, is maintained operated over one release of relay PF and until the succeeding counting chain relay operates. Under this arrangement, the state of the counting chain identifies which operate and release cycle of relay PF obtains at any time. This fact is used in conjunction with the control circuits to provide alternate grounds to generate pulse length codes.

*Integration of code generating circuits*

Now that the over-all operation of the pulse generator and counting chain have been described in detail, it will be relatively easy to demonstrate how the control circuits, operating in conjunction with the counting chain, provide an alternate operating path for sending relay S to produce a preselected pulse length code. As was pointed out earlier, terminals A, AA, B and BB, which are attached in the case of control circuit No. 1 to make contacts 6, 7, 4 and 5, respectively, of relay CL, are connected by cross-connections 522, 525, 510 and 514 to selected ones of coding leads A1 through A6 and B1 through B6 (of FIGS. 1 and 5) depending upon the specific two-out-of-five pulse length code to be generated. To produce the exemplary code mentioned supra, that is the digits 4 and 9 preceded by a Prepare pulse, terminals A, AA, B and BB are connected by cross-connections 510, 514, 522 and 525, respectively to coding leads A1, A5, B3 and B6. With this arrangement, these four coding leads are at ground potential during the time relay CL is operated. It will be remembered that relay CL is maintained operated during the entire time the pulse generating circuit is operative.

It may be observed by referring to FIG. 5 that lead A1 is connected to an armature of relay P4, that lead A5 is connected to an armature of relay P8, that lead B3 is connected to an armature of relay P3, and that lead B6 is connected to an armature of relay P6. Therefore, whenever a principal operating circuit for sending relay S (i.e., a circuit through make contact 2 of relay PF) is interrupted by the release of relay PF and the counting chain relay which is held operated (by the application of ground over lead 412 and make contact 3 of relay PF) is relay P4, P8, P3 or P6, an alternate operating path for sending relay S is completed through the counting chain to ground.

As was described previously, the pulse length code which is to be placed on signaling line 423, comprises a Prepare pulse (approximately 250 milliseconds in duration) followed by a two-digit, two-out-of-five pulse length code. The short pulses are approximately 50 milliseconds and the long pulses are approximately 150 milliseconds, and the time duration between each pulse corresponds to approximately 50 milliseconds. The application of the 250-millisecond Prepare pulse to signaling line 423 requires that the first three short pulses placed upon signaling line 423 by the operation of sending relay S, as a result of the operation of relay PF, must be "bridged" by an alternate holding path for sending relay S, which path includes certain ones of the counting chain relays. When the first operation of relay PF (1PF on FIG. 6), which operates sending relay S to place the first short pulse on signaling line 423, is interrupted due to the release of relay PF, an alternate operating path for relay S is provided from ground over make contact 4 of relay P1, back contact 4 of relay P10, lead 413, and through the winding of relay S to negative battery. This operating circuit maintains relay S operated during the time it would normally be released as a result of the release of relay PF. The next operation of relay PF (2PF on FIG. 6) enables relay P2 to operate, which in turn releases relay P1. The release of relay P1 interrupts the alternate operating path for relay S. After the second release of relay PF, which has maintained relay S operated over what would normally be the second short pulse on signaling line 423, an alternate operating circuit for relay S is provided from ground over make contact 5 of relay P2, back contact 4 of relay P10, lead 413, and through the winding of relay S to negative battery. The closure of this circuit allows relay S to maintain the pulse on signaling line 423 during the next period in which relay S and relay PF would normally be released. The third operation of relay PF (3PF on FIG. 6) again holds relay S operated by virtue of the principal operating circuit. At the end of this third operation of relay PF, however, there is no alternate operating path provided through the relay counting chain to maintain relay S operated and, hence, relay S releases. Under this arrangement the first three pulses placed on signaling line 423 by the operation of relay S as it follows the operation of relay PF, are "bridged" as a result of alternate holding paths for relay S through counting chain relays P1 and P2 (see time axis IV on FIG. 6). Once the Prepare pulse is placed on line 423, relay S resumes its alternate operation and release whereby short pulses are placed upon the line 423, at least until the operation of relays P4, P8, P3 and P6 in the counting chain.

The operation of relay P4, as relay PF continues to step the counting chain and to operate and release sending relay S, provides an auxiliary operating path for relay S. This path extends from ground over back contact 6 of relay CL, cross-connection 510, conductor A1, make contact 5 of relay P4, back contact 4 of relay P10 to lead 413, and thence through the operating winding of relay S as previously described. The provision of this alternate operating path for relay S maintains it operated after its operation for the fourth time by relay PF (pulse 4PF on FIG. 6) and until relay PF again restores the principal operating path for the beginning of what would be the fifth pulse (pulse 5PF on FIG. 6). This alternate operating circuit provides a "long" pulse of 150 milliseconds three times the length of a short one. Thereafter the PF relay continues to operate relay S for the application of short pulses to signaling line 423. This continues until relay P8 is operated. The operation of relay P8 provides another alternate operating circuit for relay S extending from ground over make contact 7 of relay CL, cross-connection 514, conductor A5, make contact 5 of relay P3, back contact 4 of relay P10 to lead 413, etc. as previously described. This alternate operating path maintains relay S operated during the eighth and ninth operations of relay PF (between pulses 8PF and 9PF on FIG. 6).

After the next release of relay PF, the pulse generating circuit continues to energize relay S to apply pulses to signaling line 423 and to step the counting chain. After relay PF has operated to complete a circuit for relay S for the thirteenth time (pulse 13PF on time axis IV of FIG. 6), relay P3 in the counting chain, which is also operated at that time, completes the alternate operating circuit for relay S. This circuit is traced from ground over make contact 4 of relay CL, cross-connection 522, conductor B3, make contact 5 of relay P3, make contact 5 of relay P10 (which relay remained operated, it will be recalled) and over lead 413 to relay S. With this arrangement the thirteenth and fourteenth pulses (pulses 13PF and 14PF along time axis IV on FIG. 6) placed on signaling line 423 by relay S, as a result of the operation of relay PF, are "bridged" to provide another long pulse. After relay PF releases (trailing edge of pulse 14PF), relay S is again repetitively connected to signaling line 423 to place short pulses thereon.

The ensuing sixteenth and seventeenth operations of relay S (as a result of pulses 16PF and 17PF) are "bridged" due to an alternate path through relay P6 in the counting chain. This alternate circuit including the winding of relay S extends from ground over make contact 5 of relay CL, cross-connection 525, conductor B6, make contact 6 of relay P6, make contact 5 of relay P10 and over lead 413 to the winding of relay S.

As explained before, the next operation of relay P7 completes an operating circuit for relay STP which, upon operating, disables the pulse length code generating circuit to await further operations of start key K1.

To recapitulate (see FIG. 6), the PG relay operates and releases in accordance with time axis I. Time axis II illustrates the timing for the operation of relay S in response to its principal operating circuit through a make contact of relay PF. Thus, whenever relay PG releases, relay S is operated through contacts of relay PF to place a short pulse on signaling line 423. The operation of relay PF, as can be seen by observing time axis III, also sequentially steps the counting chain in synchronism with the completion of the operating circuit for relay S. Time axis IV is a time displaced flow chart arrangement to illustrate the operation of relay S via the PF relay and preselected relays of the counting chain. A series of operations of relay S, numbered 1PF through 17PF, place voltage on signaling line 423 as a result of the operation of relay PF (over the principal operating circuit for relay S). To form the exemplary pulse length code—a Prepare pulse and the digits 4 and 9—pulses 1PF and 2PF, 2PF and 3PF, 4PF and 5PF, 8PF and 9PF, 13PF and 14PF, and 16PF and 17PF corresponding to operations of relay S via the PF relay are "bridged" by alternate operating circuits including relay S which extend through appropriate operated relays in the relay counting chain. These alternate operating circuits for relay S are provided through counting chain relays P1, P2, P4, P8, P3 and P6, respectively.

Having explained in detail how control circuit No. 1 cooperating with the pulse generator and the counting chain produces a pulse length code comprising the digits 4 and 9 it might be well to briefly indicate how control circuit No. 50, which is similar componentwise to control circuit No. 1, produces the digits 8 and 2.

It will be noted that terminals A, AA, B and BB of control circuit No. 50 are connected over cross-connections 511, 515, 520 and 523, respectively, to conductors A2, A6, B1 and B4. This provides alternate operating circuits for relay S whenever relays P5, P9, P1 and P4 of the counting chain are operated. With this provision for alternate operating paths for relay S, the Prepare pulse is followed by the digits 8 and 2 in a two-out-of-five (0—1—2—4—7) code. It is, of course, apparent that other combinations in a conventional two-out-of-five code can be provided by proper coding of terminals A, AA, B and BB.

*Receiver*

The pulse length code generated and applied to signaling line 423 is transmitted to a receiver which is shown in the skeletonized disclosure of FIG. 4. The particular receiver disclosed is utilized to convert the pulse length code into orders to power switches for their proper maintenance. Of course, many other uses of such pulse length code generators could be perceived. There would be a receiver for each control circuit or group of control circuits, depending upon the arrangement of the over-all remote control system. For example, if only one power switch is to be controlled at a remote station, there would be a receiver for each control circuit code. On the other hand, there might be ten switches at each of ten remote stations. In this situation, the first digit of a code could identify the receiver (one of ten) and the second digit the particular switch. Then again, there might be only one remote station with one to fifty switches (as illustrated).

Each pulse appearing on signaling line 423 completes an operating circuit for polarized relay RR associated with the particular receiver corresponding to the pulse length code selected for transmission as well as comparable relays at other receivers. This circuit may be traced from the upper side of signaling line 423 over back contact 1 of relay RS, through the winding of relay RR, and over back contact 4 of relay RS to the lower side of signaling line 423. Following each pulse, which is applied across the winding of relay RR and operates it to front contact 1, the polarity is reversed by virtue of the switching function of relay S in the signal generating circuit. This reoperates relay RR to its back contact 2. The alternate application of ground from the armature of relay RR over leads 452 and 453 to the receiving equipment 454 reproduces the pulse length code generated at the sending circuit.

The receiving equipment 454 at any particular remote receiver is provided with the necessary circuitry for comparing the pulse length code received with its own unique pulse length code. If the code received is directed to that particular receiver, the receiver may be enabled to operate selected remote power switches S1 through S50 or to check the instant state of one or more of the switches. Further means may be provided at the receiver to transmit compliance of any orders received to the main or signal generating station where the pulse length code was originally generated. Information on the state of remote power switches S1 through S50 or changes in the condition thereof are transmitted by way of circuit 461 to sending equipment designated 455 which comprises the necessary circuitry for properly placing ground on relay RS over lead 456 to complete an operating circuit for relay RS, which circuit extends through the winding of relay RS and resistor 459 to negative battery. The appropriate placement of ground on lead 456 to operate relay RS switches signaling line 423 from back contacts 1 and 4 of relay RS to its front contacts 2 and 3, respectively. This completes a sending circuit from the remote receiver to the main station which extends from ground through resistor 457 and over make contact 2 of relay RS to the upper side of signaling line 423 and back over the lower side of signaling line 423, make contact 3 of relay RS and resistor 458 to negative battery. The application of this circuit to signaling line 423 is made to occur when the signal generating circuit at the main station is deenergized and hence the signaling currents from the receiver operate polarized relay R at the main station to feed appropriate grounds over lead 426 to receiving equipment 400 as previously explained.

Though the signal generating circuit disclosed is particularly directed to the generation of pulse length codes, it is not difficult to visualize pulse length codes "ordering" the remote station switches, represented by preselected codes, to change their "state" or, in the alternative, merely report their instant position to the main station. Some of these more elaborate uses of such a selected pulse length code signaling circuit require more equipment which has not been disclosed since the instant invention is concerned with the means for generating such selective pulse length codes, not in their precise utilization.

Conclusion

As pointed out above, it is well within the scope of the instant invention that a pulse length code of more than two discrete pulse lengths be utilized and also one not restricted to a two-out-of-five code. Clearly the utilization of a three-out-of-seven code of two discrete length pulses or a three-out-of-nine pulse length code utilizing three discrete length pulses, for example, come within the scope of the disclosed invention.

Thus, it is to be understood that the above-described arrangements are illustrative of the application of the principles of this invention. Numerous other arrangements may be devised by those skilled in the art without departing from the spirit and scope of the invention.

What is claimed is:

1. A signaling generator comprising, in combination, pulse generating means for generating a series of substantially equal length pulses, said pulses separated by intervals substantially equal to the length of said pulses, means connected to said generating means for counting said pulses, and bridging means connecting said counting means and said generating means and responsive to preselected pulse counts of said counting means to produce long pulses by bridging at least two consecutive short pulses in said series thereby establishing a ratio of integers between the length of any one of said long pulses and the pulses in said series.

2. In a signaling system and including a signaling line, a pulse length code generator comprising, in combination, a source of power, means for repetitively generating a series of pulses, multistate counting means responsive to said series of pulses, said counting means assuming a different state for each successive pulse, switching means operable to apply said source of power to said signaling line, first circuit means directly connecting said means for generating said pulses to operate said switching means, and second circuit means effective upon the presence of a preselected state of said counting means to maintain said switching means operated, said preselected state, whenever it obtains, causing said switching means to remain operated for a time duration at least longer than that represented by any of the pulses in said series.

3. In a signaling system, in combination, a signaling line, a source of power, a pulsing relay, a sender relay means operable to cause said pulsing relay and said sender relay to operate and release repetitively, a relay counting chain, said counting chain controlled by said pulsing relay to advance one position upon each operation of said pulsing relay, said sender relay operable in response to each operation of said pulsing relay to connect said source of power to said signaling line, and means responsive to preselected positions of said counting chain to hold said sender relay operated between operations of said pulsing relay.

4. In a signaling system for generating a two-out-of-five long and short pulse length code, in combination, a signaling line, a pulsing relay, means operable to cause said pulsing relay to operate and release repetitively, said operate and release times being substantially equal, a relay counting chain, said counting chain controlled by said pulsing relay to advance one position upon each operation of said pulsing relay, a source of power, a sender relay, said sender relay operable in correspondence with each operation of said pulsing relay to connect said source of power to said signaling line, and means responsive to two unique and preselected positions of said counting chain to hold said sender relay operated between operations of said pulsing relay in order to form said pulse length code.

5. A pulse length code generator comprising a generator of periodic impulses, a signaling line, a source of power, switching means for controllably connecting said source to said line, conductive circuit path means interconnecting said generator and said switching means for normally controlling said switching means direct synchronism with said impulses, counting means having an input and an output, said input being connected to said generator, said counting means delivering a control signal at said output during predetermined counts of said impulses applied at said input, and means interconnecting said output and said switching means for superimposing said control signal on said circuit path means during said predetermined counts.

6. A signaling generator comprising, in combination, pulse generating means for generating a series of normally short pulses, said series being characterized by intervals of first and second signal levels, means for counting said pulses, and means effective at preselected pulse counts of said counting means for causing said generating means to bridge consecutive short pulses in said series thereby extending said first signal level through at least one said second signal level interval.

References Cited in the file of this patent

UNITED STATES PATENTS

| 1,957,672 | Saunders | May 8, 1934 |
| 2,502,443 | Dunn | Apr. 4, 1950 |
| 2,617,980 | Gray | Nov. 11, 1952 |